3,029,267
DIBUTYLTIN DITHIOACYLATES
Morris B. Berenbaum, Levittown, and Eugene R. Bertozzi, Yardley, Pa., assignors to Thiokol Chemical Corporation, Trenton, N.J., a corporation of Delaware
No Drawing. Filed Jan. 21, 1958, Ser. No. 710,196
4 Claims. (Cl. 260—429.7)

This invention relates to sulfur-containing organic tin compounds, their preparation from thio acids, and to vinyl resins stabilized therewith.

Vinyl resins are well known in the art and are recognized generally to have valuable properties. They are generally prepared by a more or less complete polymerization of a vinyl halide, such as vinyl chloride, or by co-polymerization of mixtures of vinyl halides and the vinyl esters of aliphatic acids. The most common of such resins are those containing between about 60 and 97% vinyl chloride, the balance being vinyl acetate, and having average molecular weights ranging from about 5,000 to 25,000. In compounding and processing vinyl resins into molded or extruded articles, or in preparing coating compositions therefrom, it is usually necessary to heat the material to an elevated temperature. This tends to promote deterioration of the resin. It is of course also possible that such resins may encounter elevated temperatures in normal usage, in which event deterioration is likewise to be expected. The deterioration is ordinarily accompanied by a development of color in the resin from various stages beginning with a faint yellowing of a clear resin to an ultimate blackening and charring, the resin yellowing more deeply and then passing through various shades of tan to brown in the intermediate stages.

In accordance with the invention it has been found that sulfur-containing organic tin compounds are surprisingly effective as anti-oxidant stabilizers for vinyl resins and that such compounds can readily be prepared by reaction of a dialkyltin oxide with an organic thio acid. The compounds discovered to be most effective in the heat stabilization of vinyl resins are those having the general formula I.   $(C_4H_9)_2Sn(SCR)_2$
          $\parallel$
          $O$ in which the R's represent hydrocarbon radicals, preferably alkyl, aryl and aralkyl radicals such as methyl, ethyl, lauryl, phenyl, tolyl, benzyl, and the like. The R's need not necessarily be identical in each compound. Tests have shown that the structure and molecular weight of the R radicals do not appear to be critical to the utility of the compound as a heat stabilizer or anti-oxidant for the resin.

The sulfur-containing organic tin compounds of the invention are extremely effective when incorporated in vinyl resins even at low concentrations of the order of 0.5 to 5% based on the weight of vinyl resin. While departures may be made from this range of concentration, they are not considered advisable because of the relatively insignificant effect of concentrations below 0.5%. At concentrations above 5% the compounds tend to exert a plasticizing as well as anti-oxidant effect. They are non-staining, do not cause discoloration and inhibit discoloration of vinyl resins in which they are dispersed, thus permitting preparation of stable white or colorless vinyl resins.

The compounds of the invention may be incorporated into vinyl resins in the manner conventionally followed with heretofore suggested anti-oxidants. Thus, they may be milled into the resin or, in the production of resin films, added to a solution of the resin.

The sulfur-containing organic tin compounds of the invention generally are prepared in accordance with a reaction represented by the equation:

II.   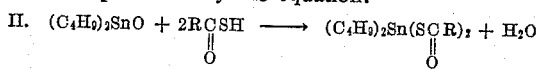

The reactants generally react upon contact and cooling should be provided to keep the exothermic reaction under control at a reasonable temperature, e.g., under about 100° C. After the reaction is substantially complete the reaction mixture can be treated, e.g., by refluxing, to remove the water that is formed and to purify the compound by distillation or other means.

Methods of preparing sulfur-containing organic tin compounds of the invention and their effectiveness in heat-stabilizing vinyl resins, as well as other advantages, will become further apparent from the following examples illustrating the best modes now contemplated of carrying out the invention.

EXAMPLE 1

*Preparation of Dibutyltin Dithioacetate*

76.11 grams (one mol) of thioacetic acid and 124.3 grams (0.5 mol) of dibutyltin oxide were charged into a reaction flask. An exothermic reaction took place and external cooling was required to keep the reaction under control at about 75° C. After the exothermic reaction had subsided, the mixture was refluxed for one hour with 150 ml. of benzene until all water was stripped off. The mixture was filtered and the solvent was removed by heating at 40 to 53° C. at a pressure of 90 to 0.50 mm. Hg. The crude product was a pale yellow oil which was purified by distillation. The pure material had a boiling point of 130 to 133° C. at 1.1 mm. Hg and a refractive index of 1.5363 at 25° C.

EXAMPLE 2

*Preparation of Dibutyltin Dithiobenzoate*

55.2 grams (0.4 mol) of thiobenzoic acid were added to 49.72 grams (0.2 mol) of dibutyltin oxide and 125 ml. of benzene charged into a reaction flask. The mixture was cooled until a slightly exothermic reaction subsided and was then heated under reflux for one hour until the calculated amount of water was removed. After heating the reaction mixture for an additional one-half hour the solvent was removed under reduced pressure on a steam bath. The mixture was cooled and filtered. The filtrate was transferred into a conical flask fitted with a distillation apparatus and was heated under nitrogen at 145° C. and at a pressure of 0.2 to 0.3 mm. Hg. No unreacted thiobenzoic acid was recovered. The crude dibutyltin dithiobenzoate was a crystalline material melting at 46 to 50° C.

EXAMPLE 3

*Preparation of Dibutyltin Dithiolaurate*

The procedure of Example 2 was repeated with an equivalent amount of thiolauric acid used as one of the reactants in place of thiobenzoic acid. The crude product was a liquid.

The analytical data for the products of the foregoing examples is summarized in Table I immediately below:

TABLE I

| Product | Sulfur, Percent | | Tin, Percent | | Yield, Percent |
|---|---|---|---|---|---|
| | Theory | Actual | Theory | Actual | |
| Dibutyltin dithioacetate | 16.75 | 17.25 | 31.0 | | 98.4 |
| Dibutyltin dithiobenzoate | 12.6 | 12.92 | 23.3 | 16.95 | 93.0 |
| Dibutyltin dithiolaurate | 9.66 | 8.36 | 17.9 | 17.60 | 82.5 |

Four 78 gram samples of a "VYHH" vinyl resin containing 85 to 88% vinyl chloride and the balance vinyl acetate, and having an average molecular weight of about 10,000, were each dissolved in a mixture of 20.4 grams dioctyl phthalate, 132.0 grams methyl isobutylketone and 187.8 grams of toluene. Three of these resin solutions, each containing 18.6% by weight resin, were mixed with 3% by weight, based on the weight of resin content, of stabilizer until the mixture was homogeneous. The four resin solutions were then spread on microscopic slides and the thin films thus formed were air-dried and placed in a 350° F. oven. The degree of color change was recorded. The stabilizers employed were the compounds prepared in Examples 1, 2 and 3.

It was found that after a half-hour of heating the control sample containing no additive showed color and that in about one hour all films showed some color. The samples mixed with dibutyltin dithioacetate (Example 1) and dibutyltin dithiolaurate (Example 3) showed the least color. The sample treated with dibutyltin dithiobenzoate (Example 2) was somewhat darker but considerably lighter than the control sample containing no stablizer.

These results indicate that representative sulfur-containing organic tin compounds in accordance with the invention are effective as anti-oxidants for vinyl resins.

It is to be expected that numerous modifications will readily become apparent to those skilled in the art upon reading this description. All such modifications are intended to be included within the scope of the invention as defined in the appended claims.

We claim:
1. An organic tin compound having the general formula

$$(C_4H_9)_2Sn(S\underset{\underset{O}{\|}}{C}R)_2$$

in which R is a member of the group consisting of alkyl having one to eleven carbon atoms, phenyl, tolyl and benzyl.
2. Dibutyltin dithiolaurate.
3. Dibutyltin dithioacetate.
4. Dibutyltin dithiobenzoate.

References Cited in the file of this patent
UNITED STATES PATENTS

| | | |
|---|---|---|
| 2,307,092 | Yngve | Jan. 5, 1943 |
| 2,480,823 | Morris et al. | Sept. 6, 1949 |
| 2,727,917 | Mack et al. | Dec. 20, 1955 |
| 2,759,906 | Leistner et al. | Aug. 21, 1956 |
| 2,762,821 | Walde et al | Sept. 11, 1956 |
| 2,891,922 | Johnson | June 23, 1959 |

FOREIGN PATENTS

| | | |
|---|---|---|
| 532,759 | Italy | Sept. 1, 1955 |
| 781,905 | Great Britain | Aug. 28, 1957 |